United States Patent
Hammond

(10) Patent No.: US 11,708,309 B2
(45) Date of Patent: Jul. 25, 2023

(54) METHOD OF PRODUCING A FERTILISER COMPOSITION AND FERTILISER COMPOSITION PRODUCED THEREBY

(71) Applicant: CCM Technologies Limited, Oxfordshire (GB)

(72) Inventor: Peter Hammond, Oxfordshire (GB)

(73) Assignee: CCM TECHNOLOGIES LIMITED, Oxfordshire (GB)

(*) Notice: Subject to any disclaimer, the term of this patent is extended or adjusted under 35 U.S.C. 154(b) by 584 days.

(21) Appl. No.: 16/071,656

(22) PCT Filed: Jan. 5, 2017

(86) PCT No.: PCT/GB2017/050015
§ 371 (c)(1),
(2) Date: Jul. 20, 2018

(87) PCT Pub. No.: WO2017/129941
PCT Pub. Date: Aug. 3, 2017

(65) Prior Publication Data
US 2021/0078916 A1    Mar. 18, 2021

(30) Foreign Application Priority Data
Jan. 26, 2016 (GB) ..................................... 1601470

(51) Int. Cl.
| C05G 1/00 | (2006.01) |
| C05F 17/40 | (2020.01) |
| C05F 17/10 | (2020.01) |
| C05G 5/14 | (2020.01) |

(Continued)

(52) U.S. Cl.
CPC ................ *C05G 1/00* (2013.01); *C05C 3/005* (2013.01); *C05C 5/005* (2013.01); *C05C 5/04* (2013.01);

(Continued)

(58) Field of Classification Search
CPC ... C05G 1/00; C05G 5/14; C05F 17/40; C05F 5/002; C05F 17/15; C05F 9/04;
(Continued)

(56) References Cited

U.S. PATENT DOCUMENTS

| 7,211,429 B1 * | 5/2007 | Rudas | ..................... C05F 17/50 435/262 |
| 7,882,646 B2 * | 2/2011 | Gorbell | ................... F26B 23/02 34/514 |

(Continued)

FOREIGN PATENT DOCUMENTS

| CA | 2843997 A1 | 8/2015 |
| CN | 104446898 A | 3/2015 |

(Continued)

OTHER PUBLICATIONS

US Composting Council. Merrimack, NH Compost. Apr. 12, 2011 <https://www.merrimacknh.gov/sites/g/files/vyhlif3456/f/file/file/compost_council_results.pdf> (Year: 2011).*

(Continued)

*Primary Examiner* — Jennifer A Smith
(74) *Attorney, Agent, or Firm* — Hoffman Warnick LLC

(57) ABSTRACT

A method of producing a fertiliser composition, the method comprising: •(a) providing partially decomposed organic matter; •(b) contacting the organic matter with: •(i) an anaerobic digestate; •(ii) a source of nitrate ion; •(iii) a source of ammonia; and •(c) contacting the mixture obtained in step (b) with a source of carbon dioxide. •Also claimed is a fertiliser composition comprising partially decomposed organic matter admixed with an anaerobic digestate, a source of nitrate ion, a source of ammonia and carbon dioxide.

6 Claims, 2 Drawing Sheets

(51) Int. Cl.
  *C05C 3/00* (2006.01)
  *C05C 5/00* (2006.01)
  *C05C 5/04* (2006.01)
  *C05F 5/00* (2006.01)

(52) U.S. Cl.
  CPC .............. *C05F 5/002* (2013.01); *C05F 17/15* (2020.01); *C05F 17/40* (2020.01); *C05G 5/14* (2020.02)

(58) Field of Classification Search
  CPC . C05F 5/00; C05C 5/005; C05C 3/005; C05C 5/04; C05C 3/00; Y02P 20/145; Y02A 40/20; Y02E 50/30; Y02W 30/40
  See application file for complete search history.

(56) References Cited

U.S. PATENT DOCUMENTS

2015/0289517 A1* 10/2015 Ott .......................... C05F 17/50 504/117
2018/0297908 A1* 10/2018 Jarvinen .................. C05F 7/00

FOREIGN PATENT DOCUMENTS

| EP | 2452930 A1 * | 5/2012 |
|----|----|----|
| GB | 2507397 A | 4/2014 |
| GB | 2507398 A | 4/2014 |
| HU | 0700693 * | 6/2009 |
| WO | 2013133703 A1 | 9/2013 |
| WO | 2014078671 A1 | 5/2014 |
| WO | 2014082007 A2 | 5/2014 |

OTHER PUBLICATIONS

Hara, Masayuki. Fertilizer pellets made from composted livestock manure. Taiwan: Food & Fertilizer Technology Center, 2001. (Year: 2001).*

US Composting Council "Compost Definition". <https://www.compostingcouncil.org/page/CompostDefinition> Aug. 8, 2020 (Year: 2020).*

Yamamoto, Taichi, et al. "Novel partial nitritation treatment for anaerobic digestion liquor of swine wastewater using swim-bed technology." Journal of Bioscience and bioengineering 102.6 (2006): 497-503. (Year: 2006).*

International Search Report and Written Opinion for PCT/GB2017/050015, dated Apr. 13, 2017, 10 pages.

Great Britain Priority Search Report for Application No. GB1601470.6, dated Jul. 18, 2016, 4 pages.

Zhang, WPI/2017 Clarivate Analytics Abstract, 2 pages.

International Preliminary Report on Patentability for International Application No. PCT/GB2017/050015, dated Jul. 31, 2018, 7 pages.

* cited by examiner 12m　　　　　　　　　　　　0m　　　　　　　　　　　　12m

METHOD OF PRODUCING A FERTILISER COMPOSITION AND FERTILISER COMPOSITION PRODUCED THEREBY

The present invention relates to a method of preparing a fertiliser and to the fertiliser composition prepared by the method and uses relating thereto. In particular the present invention seeks to provide a fertiliser composition that is prepared from one or more waste products.

As the world's population grows there is an ever increasing need to maximise resources, reduce waste and recycle as much as possible. In particular it is essential to reduce waste waste that is sent to landfill and to reduce emissions of carbon dioxide. Furthermore there is a need to maximise crop yield and thus the provision of safe and effective fertilisers is also a necessity.

According to a first aspect of the present invention there is provided a method of producing a fertiliser composition, the method comprising:
 (a) providing partially decomposed organic matter;
 (b) contacting the organic matter with:
  (i) an anaerobic digestate;
  (ii) a source of nitrate ion; and
  (iii) a source of ammonia; and
 (c) contacting the mixture obtained in step (b) with a source of carbon dioxide.

Step (a) of the method of the present invention involves providing partially decomposed organic matter. Any suitable material may be used.

In some embodiments the partially decomposed organic matter may be a fibrous material. In some embodiments it may be a non-fibrous material.

In some embodiments the partially decomposed organic matter comprises cellulose. Suitably it may comprise cellulosic fibres.

Suitable sources of partially decomposed organic matter include compost or composting matter.

Compost is typically made up of organic material such as leaves, plant waste and food waste which has been decomposed under wet and aerobic conditions.

In some embodiments the partially decomposed organic matter may be admixed with a further fibrous component that is not decomposed, for example cellulose fibres.

Step (b) of the method of the present invention involves contacting the partially decomposed organic matter with (i) an anerobic digestate, (ii) a source of nitrate ion; and (iii) a source of ammonia.

Components (i), (ii) and (iii) may be contacted with the partially decomposed organic matter sequentially, simultaneously or partially simultaneously. They may be contacted separately or one or more of the components may be premixed together prior to contacting with the organic matter.

Steps (a) and (b) may be carried out simultaneously. Thus in some embodiments partially decomposed organic matter may be provided that has already been contacted with one or more of (i) an anaerobic digestate, (ii) a source of nitrate ion; and (iii) a source of ammonia.

In one preferred embodiment steps (a) and (b) involve providing partially decomposed organic matter that has been contacted with an anaerobic digestate and then contacting this material with a source of nitrate ions and/or a source of ammonium.

As the skilled person will appreciate an anaerobic digestate is the material left following anaerobic digestion of a biodegradable feedstock. In some preferred embodiments the digestate is a methanogenic digestate.

Suitably the anaerobic digestate is provided as an aqueous composition, typically in the form of a sludge or slurry.

The anaerobic digestate may be obtained from the anaerobic digestion of any suitable material, for example grass silage, chicken litter, cattle slurry, wholecrop rye, energy beet, potato, wheat straw, chicken manure, cattle manure with straw, pig manure, food waste, food processing waste and sewage sludge.

Typically the anaerobic digestate is obtained from the anaerobic digestion of food waste or from the anaerobic digestion of farm slurry, for example pig or cow manure or chicken waste.

The anaerobic digestate may be contacted with the partially decomposed organic matter by any suitable means. In some embodiments the digestate is pumped into a vessel containing the organic matter. It may be sprayed onto it or poured onto it. The resultant mixture may be agitated.

A wide range of ratios can be used for contacting the partially decomposed organic matter with the anaerobic digestate. Suitably the weight ratio of partially decomposed organic matter to anaerobic digestate is from 0.1:1 to 10:1, preferably from 0.5:1 to 6:1.

When a ratio of 0.5:1 (partially decomposed organic matter:anaerobic digestate) is used the resultant mixture is a slurry. When a 2:1 ratio is used a sticky mixture is produced. A 4:1 ratio provides quite a dry mixture.

Step (b) of the method of the present invention also involves contacting the partially decomposed organic matter with a source of nitrate ion. The source of nitrate ion may be first admixed with the anaerobic digestate and contacted with the organic matter as a single composition and/or it may be added separately.

Suitably the source of nitrate ion is a water soluble nitrate salt. Suitable nitrate salts include alkali metal, alkaline earth metal and ammonium salts A preferred source of nitrate ions is calcium nitrate.

The source of nitrate may be provided as a solid or a liquid.

When the nitrate is contacted with the organic matter separately to the anaerobic digestate it may be suitably provided as an aqueous solution. Suitably it is added as a highly concentrated or saturated solution. In some embodiments the nitrate is added in solid form, suitably as a powder.

In some preferred embodiments the source of nitrate is admixed with the anaerobic digestate and the resultant mixture is then contacted with the decomposing organic matter—in such embodiments an aqueous solution of a nitrate salt may be admixed with the anaerobic digestate or a solid nitrate salt may be dissolved in the digestate.

Step (b) includes contacting the partially decomposed organic mater with ammonia.

Any suitable source of ammonia may be used. In some embodiments the ammonia may be provided as a gas and the process may involve pumping gaseous ammonia through a vessel containing the organic matter. Suitably the ammonia is anhydrous ammonia.

In some embodiments gaseous ammonium may be pumped through an anaerobic digestate composition.

In some embodiments an aqueous ammonia solution may be sprayed, poured or pumped into a vessel containing the partially decomposed organic matter.

In some embodiments solid ammonium hydroxide may be admixed with the partially decomposed organic matter.

In some embodiments solid ammonium hydroxide may be admixed with the anaerobic digestate prior to contacting with a partially decomposed organic matter.

In some preferred embodiments ammonia gas (preferably anhydrous ammonia gas) is pumped through the anaerobic digestate. In preferred embodiments this provides a composition comprising an anaerobic digestate and from 10 to 60, preferably 20 to 50, more preferably 30 to 40 wt % ammonia.

In some embodiments of the present invention step (b) involves preparing a composition comprising (i) an anaerobic digestate, (ii) a source of nitrate ion, and (iii) a source of ammonia; and contacting the resultant mixture with the partially decomposed organic matter. Thus step (b) may involve preparing a composition comprising an anaerobic digestate, calcium nitrate and ammonia and contacting the resulting mixture with partially decomposed organic matter.

Suitably in step (b) of the method of the present invention the molar ratio of ammonia to nitrate salt used is from 10:1 to 1:4, preferably from 6:1 to 1:2, more preferably from 4:1 to 1:1.

In some especially preferred embodiments step (b) involves preparing a composition comprising an anaerobic digestate and ammonia; contacting the partially decomposed organic matter with said composition; and contacting the partially decomposed organic matter with a source of nitrate.

Step (c) of the method of the present invention involves contacting the mixture obtained in step (b) with a source of carbon dioxide. The source of carbon dioxide may consist essentially of carbon dioxide and/or it may comprise a mixture of carbon dioxide and one or more further components.

Preferably step (c) involves contacting the mixture obtained in step (b) with a composition comprising carbon dioxide wherein the composition is gaseous form. The composition may comprise neat carbon dioxide gas and/or it may comprise a gaseous mixture of carbon dioxide and one or more further gases.

In some embodiments step (b) involves contacting the mixture obtained in step (b) with neat carbon dioxide gas.

In some embodiments step (c) involves contacting the mixture obtained in step (b) with the exhaust gas from the combustion of fossil fuel. For example step (c) may involve contacting the flue gases from a power station with the mixture obtained in step (b).

In some especially preferred embodiments the source of carbon dioxide is biogas and step (c) involves contacting the mixture obtained in step (b) with biogas.

Figure 1:
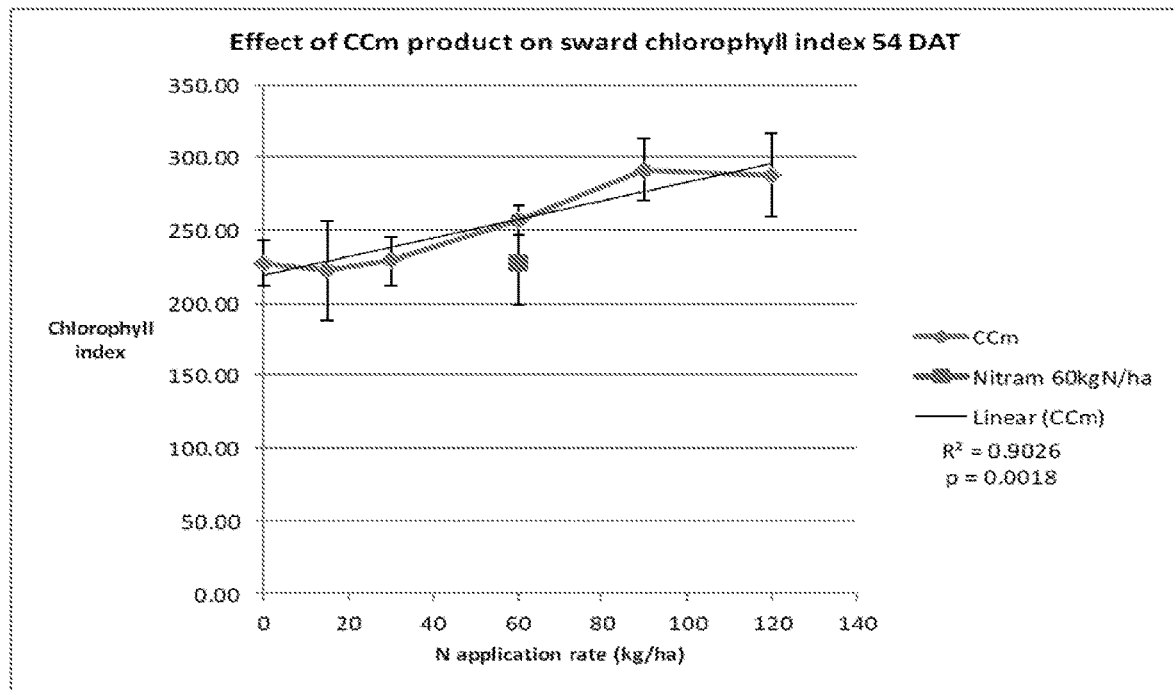
FIG. 1 shows a graph of the chlorophyll index after using the product of Example 3 below compared to using Nitram.

Biogas describes the mixture of methane and carbon dioxide that is obtained during anaerobic digestion. It may also comprise other gases in minor amounts, for example hydrogen sulphide. The exact levels of carbon dioxide and methane present in biogas depends on the mixture that has been digested and the digestion conditions. Typically biogas comprises from 20 to 80 vol % carbon dioxide, for example 30 to 70 vol %. In some embodiments biogas comprises from 40 to 45 vol % carbon dioxide and 55 to 60 vol % methane.

One particular advantage of the method of the present invention is that it uses both the digestate and the biogas produced during anaerobic digestion.

During step (c) the carbon dioxide which is contacted with the mixture obtained in step (b) is suitably retained and forms part of a new composition, that is a fertiliser composition. Thus step (c) suitably removes carbon dioxide from the source of carbon dioxide that it is contacted with. Thus in some embodiments step (c) may involve capturing carbon dioxide from the exhaust gas produced by the combustion of fossil fuel.

In some especially preferred embodiments step (c) involves removing carbon dioxide from biogas. The resulting biogas thus has an increased relative concentration of methane and will therefore burn more easily. Thus the present invention provides a method of enriching biogas.

In step (c) carbon dioxide is suitably contacted with the mixture obtained in step (b) for a time sufficient to ensure that at least 50% of the ammonia molecules present in the composition form an interaction with the carbon dioxide, preferably to ensure that at least 70%, more preferably at least 90%, preferably at least 95% and most preferably substantially all of the all of the ammonia molecules form an interaction with the carbon dioxide. Without being bound by theory it is believed that ammonium carbonate is initially formed. This is then converted to ammonium carbonate. An ion exchange reaction then typically follows to yield ammonium nitrate and calcium carbonate.

For a 5 kg batch of final product, a carbon dioxide residence time at ambient pressure is typically about 5 minutes, if a composition comprising 30 to 70 vol % carbon dioxide is used.

Step (c) is suitably carried out under aerobic conditions.

The material obtained following step (c) of the method of the present invention can be used directly as a fertiliser composition and is highly nutritious. It contains many of the minerals that plants need for growth. It also provides a useful means of storing carbon dioxide.

This product obtained therefrom can be used directly as a fertiliser or can be further processed to provide an easier to handle form.

In some embodiments the method of the present invention involves a further step (d) of further processing the material obtained in step (c). The further processing step (d) may involve drying, pulverising and/or granulating the material. Such processing methods will be known to the person skilled the art.

Preferably step (d) involves pelletising the material obtained in step (c). It has been advantageously found that the material obtained in step (c) is easily pelletised. The pellets do not clump together and spread as readily as leading commercially available fertiliser compositions of the prior art.

This is a significant advantage as many compost based fertilisers of the prior art have been difficult to pelletise and/or spread inconsistently limiting their usefulness. For example some prior art compost based compositions have had a texture or consistency causing them to stick and/or crumble in during the pelletisation process. In some cases palletisation is not possible and in other cases the resultant pellets are difficult to handle and/or have inferior properties. For example the pellets might not be stable on storage. Often pellets made from compost based compositions of the prior art often clump together. This makes spreading difficult. The ability to spread a fertiliser composition consistently is important as even coverage of a field is essential to ensure that wastage is minimised and that all areas are provided with sufficient fertiliser. Pellets which are difficult to handle will not be accepted by farmers.

The palletisation of the compositions of the present invention was easily achieved and in field trials the resultant pellets could be efficiently spread with the results achieved matching those of the leading commercially available fertiliser pellets.

Step (c) of the method of the present invention is exothermic and the method may further involve capturing the heat obtained in step (c). This heat can be reused elsewhere in the process, for example to assist a drying step or it can be used in external processes.

According to a second aspect of the invention there is provided a fertiliser composition comprising partially decomposed organic matter admixed with an anaerobic digestate, a source of nitrate ion, a source of ammonia and carbon dioxide.

Suitably the second aspect of the present invention provides a fertiliser composition obtained by the method of the first aspect.

Preferred features of the second aspect are as defined in relation to the first aspect.

Further preferred features of the first and second aspects of the present invention will now be described.

The fertiliser composition provided by the present invention comprises at least 5 wt % of nitrogen, suitably at least 10 wt %, preferably at least 12 wt %. Suitably the fertiliser composition provided by the present invention comprises up to 32 wt % nitrogen, preferably up to 30 wt %.

In some embodiments the composition comprises from 12 to 16, for example about 14 wt % nitrogen.

In some embodiments the composition comprises from 26 to 30, for example about 28 wt % nitrogen. The composition of the present invention preferably comprises one or more further plant nutrients for example potassium of phosphate.

In some embodiments the composition comprises 2 to 15 wt % potassium.

In some embodiments the composition comprises 2 to 15 wt % phosphate.

The present invention offers significant advantages in that it uses multiple waste products to generate a useful fertiliser composition. For example the present invention makes use of an anaerobic digestate which is generally considered unsuitable for direct use as a fertiliser, as it is in the form of a sludge and thus difficult to apply. By admixing with compost and other components, an easier to handle solid fertiliser composition having an improved nutrient composition is provided. Furthermore the invention can make use of the biogas produced during anaerobic digestion. Thus the present invention can be put into effect at a location where anaerobic digestion is taking place.

Step (a) involves providing partially decomposed organic matter which in step (b) is contacted with an anaerobic digestate and further components. As mentioned above, in some embodiments the anaerobic digestate may be provided already mixed with partially decomposed organic matter. For example the present invention may use the anaerobic digestate from animal waste wherein the animal waste is not separated from organic matter admixed therewith prior to digestion. For example sawdust or silage which is mixed with animal waste may be added to an anaerobic digester. The animal manure may be digested under anaerobic conditions but the cellulose or other organic matter present in the sawdust or silage may not be fully digested. However the resultant mixture comprising an anaerobic digestate and partially decomposed organic matter could be useful in the present invention.

The partially decomposed organic matter is suitably provided in solid form. However it may be wet and it may be already admixed with a digestate composition. The present invention could thus find particular use on a farm where animal waste is processed by anaerobic digestion. Thus the present invention may provide a method of preparing a fertiliser composition comprising selecting a mixture of animal waste and a solid organic material; adding enzymes to effect anaerobic digestion of animal waste and collecting the biogas produced therefrom; admixing the digestate and solid organic material with a source of nitrate and ammonia; and contacting the biogas with the resultant mixture.

This product obtained therefrom can be used directly as a fertiliser or can be further processed to provide an easier to handle form.

In some especially preferred embodiments the fertiliser composition of the second aspect is provided in the form of pellets.

The present inventors have tested products of the present invention and have found them to be as effective as a leading major fertiliser composition.

The invention will now be further described with reference to the following non limiting examples.

EXAMPLE 1

Anaerobic digestion was carried out using the feedstock mixture detailed below. This will produce approximately 25000 tonnes of digestate per annum and a biogas having an average carbon dioxide concentration of 43%

| Feedstock | Tonnes per annum | Dry solids (%) | Volatile solids (%) | Biogas yield ($m^3$/tonne VS) | Methane percentage |
|---|---|---|---|---|---|
| Grass silage | 9,000 | 25% | 90% | 600 | 53% |
| Chicken litter | 2,000 | 55% | 75% | 480 | 55% |
| Cattle slurry | 7,000 | 8% | 80% | 380 | 55% |
| Water | 6,438 | — | — | — | — |

EXAMPLE 2

Anaerobic digestion was carried out using the feedstock mixture detailed below. This will produce approximately 18000 tonnes of digestate per annum.

| Feedstock | Tonnes per annum | Dry matter (%) | Volatile solids (%) | Biogas yield ($m^3$/tonne VS) | Methane percentage |
|---|---|---|---|---|---|
| Maize Silage | 1,703 | 33 | 96 | 623 | 53 |
| Grass Silage | 1,000 | 35 | 88 | 570 | 53 |
| Wholecrop Rye | 1,700 | 35 | 91 | 585 | 53 |
| Energy Beet | 1,300 | 22 | 92 | 700 | 51 |
| Potato | 300 | 22 | 93.64 | 727 | 52 |
| Wheat Straw | 300 | 86 | 91.68 | 371 | 51 |
| Chicken Manure | 2,600 | 40 | 80 | 431 | 65 |
| Cattle Manure (with straw) | 1,000 | 25 | 80 | 451 | 55 |
| Pig Manure | 1,000 | 25 | 88 | 367 | 60 |
| Cattle Slurry | 1,000 | 10 | 85 | 400 | 55 |

EXAMPLE 3

A fertiliser composition was prepared as follows:

Ammonium hydroxide in an anaerobic digestate liquid, and calcium nitrate was added to the solution. This mixture was fed into a bulk mixer containing a compost material, for 10 minutes. The mixture was then passed to a reaction auger where it was contacted in a counter current manner with a gas flow containing carbon dioxide at 30° C., for 5 minutes. The resultant material was passed to mixer where it was combined with superphosphate and potassium chloride and mixed for 5 minutes. The resultant material was pelletised to a size of 2-4 mm.

The resultant mixture contained by weight 18% ammonium hydroxide, 8% carbon dioxide, 15% calcium nitrate, 46% in total of composts and anaerobic digestate, 9% cellulosic fibre, 2% superphosphate, and 2% potassium chloride.

EXAMPLE 4

The effectiveness of the fertiliser of example 3 was tested on an established grazed grass sward as an experimental crop.

Methodology

The trial was designed as a randomised block layout, with three replicates (blocks), each with five rates of product application, one untreated control, and a comparison treatment of Nitram®. Niatram is a proprietary fertiliser comprising ammonium nitrate. It is a market leader and is considered a standard treatment for grasslands. Nitram was applied at 60 kgN/ha which replicated normal field fertilisation practice.

The composition of example 3 was applied at a range of equivalent nitrogen (N) rates that bracketed the 60 kg N/ha field rate.

Treatments were as below. Niatram contains 34.5% nitrogen.

TABLE 1

Treatments

| | Field rates (kgN/ha) | | | | | |
|---|---|---|---|---|---|---|
| | 0 | 15.00 | 30.00 | 60.00 | 90.00 | 120.00 |
| Product rate (kgN/ha) at 14% N | 0 | 107.14 | 214.29 | 428.57 | 53 | 857.14 |
| Product rate (kg/plot) | 0 | 0.46 | 0.91 | 1.82 | 53 | 3.64 |
| Treatment number | 1 | 2 | 3 | 4 | 5 | 6 |
| Nitram (kgN/ha) | | | | 60.00 | 51 | |
| Nitram product (kg/ha) | | | | 176.47 | 52 | |
| Nitram product rate (kg/plot) | | | | 0.75 | | |
| Treatment number | | | | 7 | | |

TABLE 2

Treatment layout
Hedge/tree line Plot No's

| Block 1 | 101 | 102 | 103 | 104 | 105 | 106 | 107 |
|---|---|---|---|---|---|---|---|
| | 5 | 7 | 3 | 2 | 6 | 4 | 1 |
| Block 2 | 201 | 202 | 203 | 204 | 205 | 206 | 207 |
| | 1 | 7 | 6 | 4 | 5 | 3 | 2 |
| Block 3 | 301 | 302 | 303 | 304 | 305 | 306 | 307 |
| Farm side gate | 6 | 3 | 2 | 1 | 7 | 4 | 5 |

The trial was set out on a relatively flat, well established sheep grazed field. Blocks were aligned at right angles to the most likely field production gradient, into the field from an adjacent hedge and woodland area. Each plot measured 8.5 m×5 m; a total area of 42.5 m².

Two, one metre gaps were set out between the three blocks to allow access to the plots.

Treatments were first applied on the 28th May, referred to as day "zero" in the graphs and tables below.

Relative Chlorophyll Levels

Assessments were made of relative chlorophyll levels (roughly equivalent to "greenness") with a Field Scout CM 1000 remote chlorophyll sensor.

Yield

Yield assessments were conducted by periodic sampling using a petrol driven 35 cm cut width cylinder lawnmower to traverse across the longer, 8.5 m width of each plot, providing a unit sampling area of 2.98 m², conducted as either single or multiple passes as conditions varied across the season. Cuttings were collected and fresh weights measured shortly after their harvest. Dry weights were measured approximately 24 hrs later after drying to constant weight at 65° C. Plots were kept in a mown condition by cutting the entire trial site down to a uniform level for further sampling when sufficient re-growth had taken place. Frequency of cut for yield estimation was determined by weather and extent of grass growth. Six measurements were completed throughout the growing season, spanning a 98 day post application period.

Aerial Photography

A remotely operated quad-copter or "drone" was used to capture aerial photographs of the trial site from an altitude of approximately 120 feet. Images were processed by GIMP or ImageJ software to correct for distortion from the wide angle lens of the drone camera. Further image processing was then undertaken to measure average pixel values across at least 75% of each plot by digitally outlining an "area of interest" with the computer cursor. RGB and L*a*b* colour spaces were examined using ImageJ software. The green channel of RGB data was analysed for mean pixel intensity.

Root, Soil Carbon and Nitrogen

Soil cores were taken on the 1st October, 127 days after treatment application. Four replicate samples were taken from each plot, one for carbon and nitrogen analysis and three for root mass measurement. Samples were extracted with a hand held soil corer, to a depth of 10 cm, which removed a core with a volume of approximately 57 ml.

As the trial site was a previously a grazed permanent pasture, there was a considerable layer of both living, and dead and decaying plant tissue at the surface which made the true soil level indistinct. However the soil surface was estimated carefully and all remaining above ground tissue was cut away prior to further sample processing. Root mass estimation was made following thorough soaking of the trimmed cores and washing through a 1 mm aperture sieve to filter and collect roots, followed by drying in air at 55° C. No distinction was made between living and dead tissue.

Carbon and nitrogen contents were estimated by drying the samples, mixing each thoroughly, and grinding to a fine powder. Concentrations were measured using an Elementar vario EL cube CNS automated elemental analyser.

Statistical Analysis

Results were analysed through analysis of variance (ANOVA) and by statistical analysis of correlation coefficients of application rate response curves.

Results

Chlorophyll Index

The series of measurements indicated a statistically significant positive response to the product of example 3, throughout the season. This is illustrated by way of example in FIG. 1 which shows the chlorophyll index obtained after using the product of example 3 and that obtained after using Nitram, on day 54 of the trial.

Yield

Figure 2:
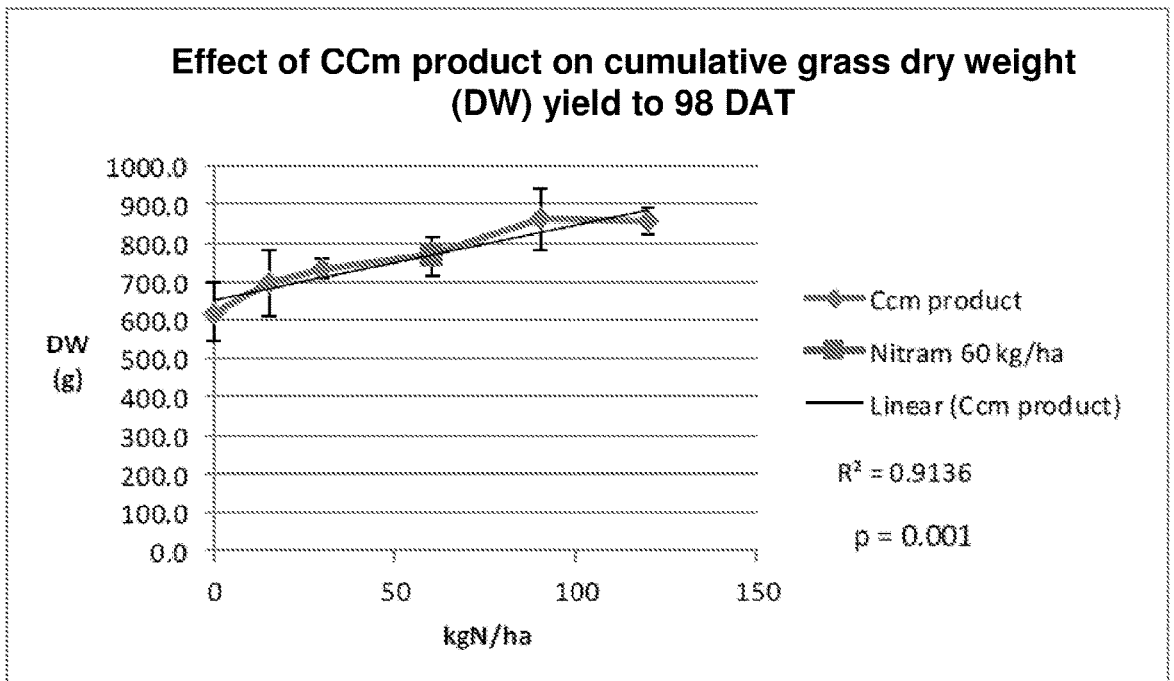
FIG. 2 shows the cumulative grass dry weight yield after using the product of Example 3 compared to using Nitram.

Yield was measured on six occasions throughout the main growth period. In all cases a positive trend was apparent. Weather conditions and sample intervals sometimes gave rise to non-statistically significant effects but the cumulative yield, over the 98 day observation period, gave a highly significant result of increasing yield with increasing application rate of the product of example 3. FIG. 2 shows the cumulative grass dry weight yield to day 98 of the trial.

Aerial Photography

Aerial observations supported data obtained from both relative chlorophyll levels and yield estimates. A trend of increasing green colour intensity was associated, at a statistically significant level, with increasing application rates of the product of example 3.

Root Mass, Soil Carbon and Nitrogen Content

Root mass measurements suggest that there was a positive response to the application of the product of example 3.

Overall the results of the trial showed that the product of example 3 performed at least as well and in some cases better than a fertiliser composition of the current leading commercial product, Nitram.

The fertiliser composition of the present invention offers the added advantages of being prepared from waste materials and thus offers significant environmental benefits.

EXAMPLE 5

Figure 3:
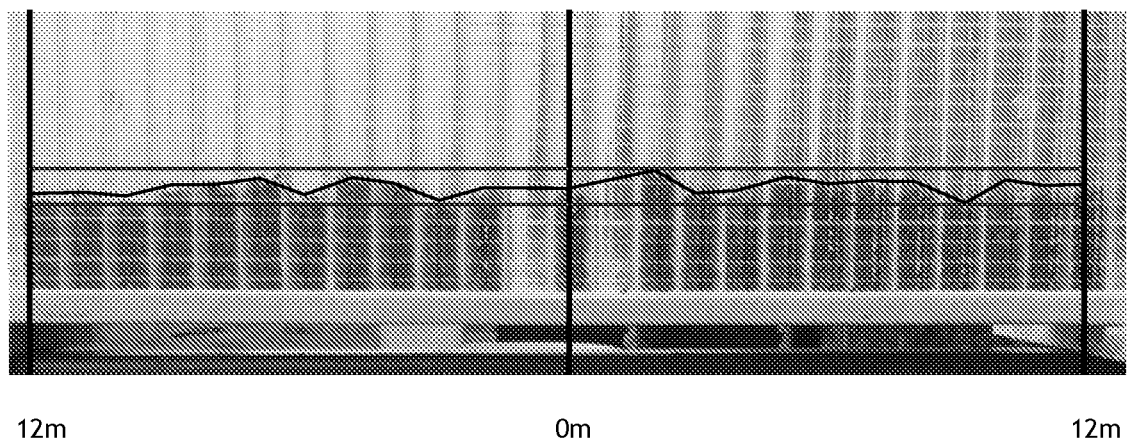
FIG. 3 shows the spreading pattern of pellets obtained in pots out to 12 m from the centre of the application.

The spreading of the fertiliser pellets example 3 was tested independently using a Kuhn Axis 30.1 spreader on grass. The height of application was set at 60 cm from the bottom of the frame and a spreadwith of 24 m was used. Spreading was tested on grass at a rate of 200 Kg/Ha with a forward speed of 10 Km/h. The coefficient of variation (CV) measures the accuracy of the spread pattern. For fertilisers a CV of 15% (as recommended in EN13739-2) should be attainable in field conditions. For the tested pellets of the present invention a CV of 7.29 was achieved. FIG. 3 shows the amount of pellets obtained in pots placed at successive 1 m intervals from the centre of application to a distance of 12 m in each direction. This illustrates that the spreading pattern achieved was consistent and met required standards.

The invention claimed is:

1. A method of producing a fertiliser composition, the method comprising:
    (a) providing partially decomposed organic matter;
    (b) contacting the partially decomposed organic matter with:
        (i) an anaerobic digestate;
        (ii) calcium nitrate; and
        (iii) a source of ammonia selected from a group consisting of ammonia and ammonium hydroxide,
    wherein step (b) involves preparing a composition comprising (i) the anaerobic digestate, (ii) the calcium nitrate, and (iii) the source of ammonia; and contacting the resultant composition with the partially decomposed organic matter; and
    (c) contacting the mixture obtained in step (b) with a composition comprising carbon dioxide wherein the composition is in gaseous form; and
    (d) pelletising the material obtained in step (c),
    wherein in step (b) the molar ratio of ammonia provided by the source of ammonia to calcium nitrate salt used is from 10:1 to 1:4; and step (c) is carried out under aerobic conditions.

2. A method according to claim 1 wherein the partially decomposed organic matter is compost or composting matter.

3. A method according to claim 1 wherein the partially decomposed organic matter comprises cellulosic fibres.

4. A method according to claim 1, wherein the anaerobic digestate is provided as an aqueous composition.

5. A method according to claim 1, wherein the composition comprising carbon dioxide is biogas.

6. A method according to claim 1, wherein step (d) further includes drying, pulverising and/or granulating the material obtained in step (c).

* * * * *